United States Patent Office 3,548,270
Patented Dec. 15, 1970

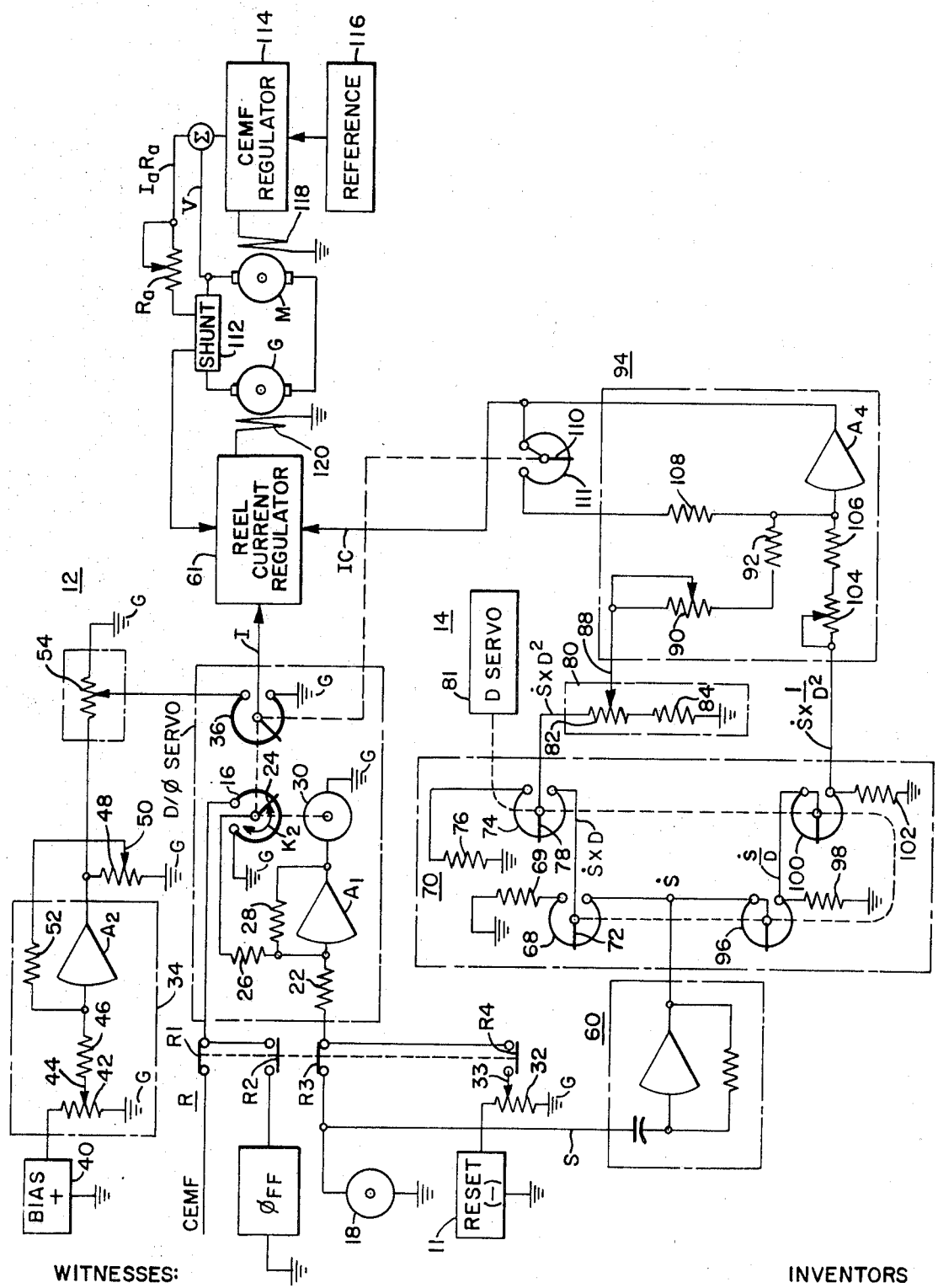

3,548,270
MAXIMUM TORQUE REEL DRIVE UTILIZING AN INERTIA COMPENSATION AND COUNTER EMF CONTROL
Antonio V. Silva, Buffalo, N.Y., assignor to Westinghouse Electric Corporation, Pittsburgh, Pa., a corporation of Pennsylvania
Filed Nov. 20, 1967, Ser. No. 684,243
Int. Cl. B65h 59/38
U.S. Cl. 318—6            5 Claims

ABSTRACT OF THE DISCLOSURE

This disclosure provides for a constant tension maximum torque reel drive under conditions of both constant and changing speeds. At constant speed, the armature current is held proportional to the ratio of linear speed to reel counter electromotive force ($S/CEMF$) which is also directly proportional to the ratio of coil diameter to field flux ($D/\phi$). During acceleration of deceleration an inertia compensation signal is provided which equals the conventional inertia compensation signal except of a multiplicative term ($D/\phi$) which may be obtained from a parallel plate of the servo for determining ($S/CEMF$) which is proportional to the fraction ($D/\phi$).

BACKGROUND OF THE INVENTION

The present invention relates to a control system for motor drives and more particularly to control systems for direct current motors used to drive reels on which material is to be wound or unwound under controlled tension.

Tension affects the coiling tightness of a strip or other form of material as it is being wound about or unwound from a reel driven mandrel. It is, therefore, desirable that strip tension be at least generally controlled during reel operation. Further, in the operation of metal reduction rolling mills and the like, reel strip tension is normally required to be held at a predetermined substantially constant value in order to minimize gauge disturbances and assure proper rolling mill operation.

In order to hold constant tension for direct current reel drive motors, neglecting electrical and mechanical losses of the reel, motor power input can be controlled in proportion to the strip speed. At any predetermined steady state strip speed, it is typical for motor input power to be controlled principally by means of field flux variation. A first control loop holds substantially constant armature current in the direct current motor as the field control varies the field flux in proportion to the variable diameter of the coil on the reel, and the armature counter electromotive force is substantially constant at the constant strip speed. Since motor torque is proportional to field flux $\phi$ and armature current $I_a$ ($T_m = K_1 \phi I_a$), the torque and tension applied to the strip by the reel as the coil diameter changes is held substantially constant $$\left[ T_s = \frac{2T_m}{D} = 2K_1 I_a \frac{(\phi)}{D} \right]$$

by holding the ratio $\phi/D$ substantially constant at a constant armature current. In selecting direct current motors for reel drive applications, the normal practice thus involves choosing a motor having a field range corresponding to the range of coil buildup.

One disadvantage associated with the variable field tension control is that maximum torque capability is realized only when the field flux reaches a maximum at maximum coil diameter. At lower coil diameters, the torque capability is below maximum because the same constant armature current is associated with less than maximum field flux. Such operational inefficiency can be restrictive on reel drive performance. For example, startup acceleration can be limited to a value less than that desired by the user because at low coil diameter and low field flux, the armature current communtating limit restricts the motor input power level.

Another disadvantage lies in the fact that the field range required for tension control is not alway compatible with motor design limits and motor cost considerations. For example, when it is desired to provide an adjustable range of constant tension, design or cost considerations may make it desirable to employ a motor having a first predetermined power rating and a field range greater than that corresponding to the range of coil buildup as opposed to employing a motor having a high power rating and a field range corresponding to the range of coil buildup. In other uses such as extremely large coil applications, a field range less than that corresponding to the rang of coil buildup may be warranted by motor economics but would not be usable because of the field range-coil buildup correspondence requirement.

A recent improvement in a tension control system was set forth in copending patent application Ser. No. 571,616, entitled "Tension Control System for a Reel Drive," by Thomas J. Dolphin and assigned to the same assignee as the present invention. In the above-mentioned system, a servo is used to calculate the value of the coil diameter D by dividing the mill linear speed by the reel r.p.m. and a second servo is made to determine $\phi$, the output of the motor field function generator, to give a rheostat displacement proportional to the calculated field flux $\phi$. The function $D/\phi$ is then generated by dividing the two signals that were obtained as described. This system necessarily requires two servos and requires a precise determination of flux $\phi$ which is difficult to acquire accurately. Moreover, should the mill have the ability to accelerate and decelerate, the inertia compensation signal would have to be modified to operate on the maximum torque constant tension principle.

It is therefore an object of the present invention to provide a new and improved tension control system for a reel drive in which improved economy and efficiency are realized.

It is another object of the present invention to provide a novel tension control system for a reel drive in which constant tension is realized with maximum torque operation at constant speeds as well as during acceleration and deceleration.

A further object of the present invention is to provide a novel tension control system for a reel drive in which field range selection can be made relatively free from considerations of coil buildup.

It is an additional object of the present invention to provide a novel tension control system for a reel drive in which improved operation is realized by means of controlling armature current as a function of coil diameter and field flux.

A still further object of the present invention is to provide a novel tension control system which does not require a precise determination of the field flux $\phi$.

Yet a still further object of the present invention is to provide a novel tension control system which will provide the proper inertia compensation signal compatible wtih the maximum torque system to maintain a constant tension on the reel drive during acceleration and deceleration.

In accordance with the principles of the present invention an improved tension control system is provided for a direct current reel motor drive. Armature current is controlled as a function of coil diameter and field flux to hold constant tension. This is achieved by a single servo providing an output proportional to the ratio of linear speed to counter electromotive force both of which are easily and accurately obtainable; moreover this ratio is directly proportional to the ratio of coil diameter to field flux. In addition, this ratio is used as a multiplicative factor to the conventoinal inertia compensation signal to provide constant tension at varying speeds.

These and other objects of the invention will become more apparent upon consideration of the following detailed description, along with the attached drawing.

DESCRIPTION OF THE DRAWINGS

The single figure shows a schematic diagram of a tension control system for a reel drive arranged in accordance with the principles of the present invention.

DESCRIPTION OF THE PREFERRED EMBODIMENT

More particularly, there is shown in the figure a tension control system 10 arranged in accordance with the principles of the present invention. The tension control system 10 is comprised of two subsystems: a current reference system 12 for providing a current reference signal I and an inertia compensation system 14 for providing a current reference IC under conditions of varying speed.

It is known that in order to maintain the strip tension constant while at the same time operating the reel with maximum flux compatible with a certain r.p.m. the current reference signal I has to be made directly proportional to the coil diameter D, and inversely proportional to the reel motor flux $\phi$, such that:

$$I = \frac{K_1 D}{\phi} \quad (1)$$

where $K_1$ equals a constant. However, if the above expression is slightly modified by multiplying the numerator and the denominator by the reel r.p.m. $\omega$, then:

$$I = K_1 \frac{D}{\phi} = K_1 \frac{D\omega}{\phi\omega} = K_2 \times \frac{S}{CEMF} \quad (2)$$

where S equals linear speed, CEMF equals the reel counter electromotive force and $K_2$ equals a constant. The function expressed by the above formula can be easily generated since the reel CEMF signal is known with good precision and is already available as a CEMF feedback signal in the motor field CEMF regulator; the mill speed may be easily obtained from a main drive tachometer. Referring now to the figure, the reel CEMF is connected through the relay contact R1 to a rheostat 16 which is then connected to ground G. A second input, the mill speed signal, is obtained from the tachometer 18 and provides an input to the $D/\phi$ servo through relay contact R3. The $D/\phi$ servo includes an operational amplifier A1 having dual input signals the first being the speed signal from the tachometer 18 through resistor 22 and the second being the portion of the CEMF signal tapped off by the wiper 24 and connected to input resistor 26.

A feedback resistor 28 is connected between the output and input terminals of amplifier A1. Output of the operational amplifier A1 is connected to a motor operated rheostat 30 which drives a series of parallel resistor plates. Operation of the motor operated rheostat 30 will cease when the output from amplifier A1 is zero or when the net input signal is also zero. For this to occur, it must necessarily mean that the input signal from the tachometer 18 must exactly balance that portion of the CEMF picked off by the wiper, 24. If the voltage drop from the position of the wiper 24 to ground is equal to $K_2$ times the total value of the CEMF signal where $0 \leq K_2 \leq 1$, then the net input signal will be zero when the linear speed $S = K_2$ (CEMF). As such, the motor operated rheostat will provide operation which necessarily maintains this equilibrium relationship. At the beginning of each new coil, relay R is picked up to open the normally closed circuits associated with relay contacts R1 and R3 and to close the normally open relay contacts R2 and R4. The normal CEMF signal is then replaced by a reset signal of the positive polarity which would be equivalent to the known full field value $\phi_{FF}$. The normal tachometer signal is replaced by a reset signal 11 of negative polarity which would be equivalent to the initial coil diameter empty coil on winding reels; and full coil on payoff reels. This signal is connected through a resistor 32 to ground G and the operator, by an adjustment of the tap 33, may pick off any or all of the total signal as required.

A reference calibration module 34 cooperates with the $D/\phi$ servo by having its output connected through rheostat 36, a parallel plate of the motor operated rheostat 30, to ground G. The reference calibration module 34 serves to provide an upper limit for the output of the $D/\phi$ servo.

A bias signal of positive polarity 40 provides a maximum input reference to the reference calibration module 34 by acting through a resistor 42 to ground potential G. An adjustable tap 44 picks off a portion of this input bias 40 to provide an input to the amplifier $A_2$ through the input resistor 46. The output of the amplifier $A_2$ is connected to ground potential G through a resistor 48. The resistor 48 in cooperation with an adjustable tap 50 forms part of the mill speed preset rheostat. A signal equal to the voltage picked off between adjustable wiper 50 and ground potential is then used as a feedback signal through feedback resistor 52 to the amplifier $A_2$. In addition, the output from the amplifier $A_2$ is connected to a tension adjust rheostat 54 the other side of which is connected to ground potential G. Adjustment of this rheostat by the operator ultimately provides the maximum output signal which may be realized from the $D/\phi$ servo. The reference calibration module 34 is kept in saturation by the level of the bias signal 40 until the preset speed as set by tap 50 in cooperation with resistor 48 exceeds a certain value dependent on the coil diameter range and the reel speed range. For example, if the coil diameter range is 2:1 and the reel speed range is 4:1, the bias reference 40 should be adjusted for the amplifier $A_2$ to remain saturated for all mill preset speeds below 50% of the maximum. For higher speeds, however, the output of the amplifier $A_2$ becomes inversely proportional to the initial preset speed thus limiting the maximum current reference that could be obtained. The output of the $D/\phi$ servo thus provides a current reference signal I to the reel current regulator 61.

During acceleration or deceleration, an extra accelerating torque has to be provided by the reel machine. This torque is given by:

$$T_a = J\dot{W} \quad (3)$$

where $T_a$ equals the accelerating torque, J equals the total inertia, W equals r.p.m. and $\dot{W}$ equals $dw/dt$. The total inertia J can be separated into a fixed inertia component $J_f$ (machine rotor plus mandrel plus gear, etc.) and a variable inertia component $J_v$ (coil inertia). By calculating expressions for $J_f$ and $J_v$ the total inertia J can be given by the formula:

$$J = J_f + J_v = J_o + \frac{\pi L}{32} + D_o^4(\rho_f - \rho_v) + \frac{\rho_v \pi L}{32} D^4 \quad (4)$$

Where:

$J_o$ = inertia of motor plus gears
$D_o$ = mandrel diameter
L = strip width
$\rho_f$ = specific mass of mandrel
$\rho_v$ = specific mass of the strip material
D = coil diameter The above expression can be rewritten as:

$$J = C_1 + C_2 D^4 \quad C_1 = J_o + \frac{\pi L}{32} D_o^4(\rho_f - \rho_v) = \text{constant}$$

$$C_2 = \frac{\rho_v \pi L}{32} = \text{constant} \quad (5)$$

By then substituting the above into the expression for torque $T_a$ and keeping in mind that the torque in a DC machine is given by $T_a = K_t \phi I_a$ where $\phi$ equals the field flux, $I_a$ equals the armature current, and $K_t$ equals the constant, by solving for $I_a$ gives:

$$I_a = \frac{\dot{W}}{K_t \phi}(C_1 + C_2 D^4) \qquad (6)$$

By approximating $\dot{W}$ approximately equal to $\dot{S}/D$, then:

$$I_a = \frac{\dot{S}}{K_t}\left(\frac{D}{\phi}\right)\left[\frac{C_1}{D^2} + C_2 D^2\right] \qquad (7)$$

which is the form of the current necessary during accelerations or decelerations of the reel. It should be noted, that except for the multiplicative term $D/\phi$, the form of this current for accelerating is the same as in conventional reel drives. Fortunately the multiplicative term $D/\phi$ has been realized through the $D/\phi$ servo pertaining to the constant speed system 12.

Referring now to the inertia compensation system 14 in the figure an input signal is provided from the tachometer 18 equivalent to the linear speed S. The linear speed S is differentiated by the speed differentiator 60 to provide an output signal $\dot{S}$. Output from the speed differentiator 60 is connected to a function generator 70 which provides output components relating to both a variable inertia component and a fixed inertia component. In one case, the signal $\dot{S}$ is connected through a rheostat 68, and a resistor 69 to ground potential G. A wiper 72 operates on rheostat 68 to provide a signal level proportional to the coil diameter D. This signal is then connected through rheostat and resistor 74 and 76 respectively to ground potential G. A wiper 78 picks off a signal equal to the potential difference between the wiper 78 and ground potential G which is equivalent to a signal having a value of $\dot{S} \times D^2$. Resistors 69 and 76 are proportional or electrical equivalents of the diameter of the mandrel $D_0$ onto which the coil is wound. The portions of the rheostats 68 and 74 over which the signal is taken through wipers 72 and 78 is proportional to the additional diameter created by the coil being wound around the mandrel. Thus, the total diameter of the mandrel plus the coil wound around it would be proportional to the voltage across the respective mandrel-coil combination resistors. The signal $\dot{S} \times D^2$ as picked up by wiper 78 is then connected to a sheet width rheostat 80. This rheostat is comprised of a resistor 82 connected to an additional resistor 84 which is then connected to ground potential G. A selected portion of the signal $\dot{S} \times D^2$ is picked off by an adjustable tap 88 acting on resistor 82 and then connected to input resistors 90 and 92 of the inertia compensation controller 94. Resistor 90 is adjustable to provide a variable inertia adjustment which in effect will operate to provide the proper relationship of constants requisite to a correct signal component for the variable inertia.

The output $\dot{S}$ from the speed differentiator 60 is also fed through rheostat 96 and resistor 98 to ground potential G. Resistor 98 is proportional to the diameter of the mandrel and the effective resistance portion of rheostat 96 is proportional to the diameter of the coil wound around the mandrel. Thus, the signal at a position between resistors 96 and 98 is equivalent to $\dot{S}/D$ where D is the total diameter of the mandrel plus the wound coil. This signal is then connected through rheostat 100 and resistor 102 to ground potential G. Resistor 102 is proportional to the diameter of the mandrel and the effective portion of rheostat 100 is proportional to the diameter of the wound coil. It should be noted that the additional diameter caused by the wound coil and represented by the effective resistances of resistors 68, 78, 96 and 100 are parallel plates of a conventional diameter servo 81. The signal at the point between resistors 100 and 102, will be proportional to $$\dot{S} \times \frac{1}{D^2}$$

and will be connected to input resistors 104 and 106 of the inertia compensation controller 94. Resistor 104 is a variable resistor which provides for adjustment of the necessary constant values required to maintain a proper output relationship. The inertia compensation controller 94 consists of an amplifier $A_4$ having in its feedback loop a resistor 108 and another rheostat 111 which is proportional to the ratio of $D/\phi$ and which is obtained from an additional parallel plate 111 of the $D/\phi$ servo. The output of the amplifier $A_4$ thereby provides an inertia compensation signal to the reel current regulator 61. The combined signals I and IC to the reel current regulator 61 thereby provide an operating reference for the reel drive motor. It should be noted that there will be an absence of the inertia compensation signal IC whenever the linear speed as taken from a tachometer 18 is a constant since there would be not output from the speed differentiator 60.

Output of the reel current regulator 61 energizes the field 120 associated with generator G which thereby provides a reference signal for the reel drive motor M. Armature current $I_A$ is monitored by a shunt circuit 112 and provides negative feedback to the current regulator 61. The shunt circuit 112 also connects to an adjustable resistor $R_{ia}$ corresponding to the armature resistance of motor M to provide an input to the summing junction $\Sigma$ of $I_a R_a$. A second input to summing junction $\Sigma$ and of opposite polarity to the first input $I_a R_a$ is the generator voltage V; the combination of these two inputs provides an output from summing junction $\Sigma$ equal to the counter-electromotive force $(CEMF = V - I_a R_a)$. This counter electromotive force provides an input signal to a CEMF regulator 114. A second input to the CEMF regulator 114 and of opposite polarity to CEMF input is a reference signal 116. Output from the CEMF regulator 114 is used to control the field strength of the motor field 118. During the normal operation of the motor M the CEMF regulator is saturated as a result of the reference signal 116 and the motor field 118 is held at full field strength. However, should the motor speed be in excess of the operating speed at full field, the CEMF signal will then operate to override the reference signal 116 and weaken the strength of the motor field 118 to permit higher speeds without consequent equipment damage.

The foregoing description has been presented only to illustrate the principles of the invention and it is realized that certain elements of the system may have electronic or other substituted, for example, the motor operated rheostat 30 may be replaced by any electronic type multiplier (divider). Accordingly, it is desired that the invention not be limited by the embodiment described but, rather, that it be accorded an interpretation consistent with the scope and spirit of its broad principles.

I claim as my invention:
1. A tension control system for a direct current reel drive motor operative to wind or unwind a coil of strip material or the like, said system comprising;
    first sensing means for providing a control signal proportional to the counter electromotive force of said direct current reel drive motor,
    second sensing means for providing a speed signal proportional to the linear speed of said coil,
    tension controlling means for maintaining a substantially constant tension by developing a reference input signal to said reel drive motor directly proportional to said speed signal and inversely proportional to said control signal,
    an inertia compensation controller means which cooperates with said tension controlling means to provide an inertia compensation reference input directly proportional to the linear speed of said coil, and inversely proportional to the reel drive motor counter electromotive force, so that said inertia compensation reference has an adjustable fixed inertia component and an adjustable variable inertia component, both of which components are directly proportional to the diameter of the coil and inversely proportional to the flux field strength of said reel drive motor, said inertia compensation controller means including means for adjusting said variable inertia component as a function of the width of said coil, and coil diameter to field flux servo means, responsive to the counter electromotive force of said reel motor drive and to the linear speed of said coil, to develop the diameter-flux reference input signal.

2. A tension control system for a direct current reel drive motor operative to wind or unwind a coil of strip material or the like, said system comprising;

first sensing means for providing a control signal proportional to the counter electromotive force of said direct current reel drive motor, second sensing means for providing a speed signal proportional to the linear speed of said coil, tension controlling means for maintaining a substantially constant tension by developing a reference input signal to said reel drive motor directly proportional to said speed signal and inversely proportional to said control signal, an inertia compensation controller means which cooperates with said tension controlling means to provide an inertia compensation reference input directly proportional to the linear speed of said coil and inversely proportional to the reel drive motor counter electromotive force, so that said inertia compensation reference has an adjustable fixed inertia component and an adjustable variable inertia component, both of which components are directly proportional to the diameter of the coil and inversely proportional to the flux field strength of said reel drive motor, said inertia compensation controller means including means for adjusting said variable inertia component as a function of the width of said coil, coil diameter to field flux servo means responsive to the counter electromotive force of said reel motor drive and the linear speed of said coil to develop the diameter-flux reference input signal, and including means for coupling said diameter-flux reference input signal to said inertia compensation controller means.

3. A tension control system for a direct current reel drive motor operative to wind or unwind a coil of strip material or the like, said system comprising;

first sensing means for providing a control signal proportional to the counter electromotive force of said direct current reel drive motor, second sensing means for providing a speed signal proportional to the linear speed of said coil, tension controlling means for maintaining a substantially constant tension by developing a reference input signal to said reel drive motor, directly proportional to said speed signal and inversely proportional to said control signal, and counter electromotive force regulator means in the field of said reel drive motor, and current regulator means having a variable operating reference connected in the armature circuit of said reel drive motor.

4. A control system for a direct current reel drive motor operative to wind or unwind a coil of strip material or the like for insuring maximum available torque during accelerations and decelerations comprising;

means for supplying during said accelerations an additional component of armature current equal to:

$$K\dot{S}\left(\frac{S}{Ec}\right)\left[\frac{C_1}{D^2}+C_2D^2\right]$$

where:
K is a constant of proportionality
S is the linear velocity of said coil of strip material
$\dot{S}$ is the acceleration of said coil of strip material
Ec is the instantaneous counter electromotive force of said direct current reel drive motor
$C_1$ is a constant which is a function of the fixed inertia of said system
$C_2$ is a constant which is a function of the variable inertia of said system
D is the instantaneous diameter of said coil of strip material.

5. A control system for a direct current reel drive motor operative to wind or unwind a coil of strip material or the like comprising;

(a) means for deriving a first analog speed signal directly proportional to the linear velocity of said coil of strip material, (b) means for deriving a second analog signal proportional to the counter electromotive force of said direct current motor, (c) means for controlling the armature current of said direct current motor in direct proportion to said first analog speed signal and inversely proportional to said second analog signal to thereby maintain constant tension on said coil of strip material during constant speed conditions, and (d) means for providing during said accelerations an additional component of armature current equal to:

$$K\dot{S}\left(\frac{S}{Ec}\right)\left[\frac{C_1}{D^2}+C_2D^2\right]$$

where:
K is a constant
$\dot{S}$ is the rate of acceleration
S is the linear velocity of said coil of strip material
Ec is the counter electromotive force of said direct current reel drive motor
$C_1$ is a constant based on the fixed inertia of said system
$C_2$ is a constant based on the variable inertia of said system and
D is the instantaneous diameter of said coil of strip material.

References Cited

UNITED STATES PATENTS

| | | | | |
|---|---|---|---|---|
| 2,703,853 | 3/1955 | Fennell | | 318—7 |
| 2,862,161 | 11/1958 | Abell | | 318—6 |
| 2,917,689 | 12/1959 | Abell | | 318—6 |
| 3,189,809 | 6/1965 | Dolphin | | 318—6 |

ORIS L. RADER, Primary Examiner

A. G. COLLINS, Assistant Examiner